United States Patent
Rassing et al.

(10) Patent No.: US 6,277,910 B1
(45) Date of Patent: Aug. 21, 2001

(54) WATER-BORNE HYBRID BINDER COMPOSITION AND USE THEREOF

(75) Inventors: Jørgen Rassing, Holte (DK); Michael Borén, Lund (SE); Lars-Olof Ryrfors, Perstorp (SE); Jan-Erik Jönsson, Lund (SE)

(73) Assignees: Akzo Nobel Industrial Coatings, AB, Malmö; Hoechst-Perstorp AB, Perstorp, both of (SE)

( * ) Notice: Subject to any disclaimer, the term of this patent is extended or adjusted under 35 U.S.C. 154(b) by 0 days.

(21) Appl. No.: 09/101,465

(22) PCT Filed: Jan. 16, 1997

(86) PCT No.: PCT/SE97/00053

§ 371 Date: Jan. 22, 1999

§ 102(e) Date: Jan. 22, 1999

(87) PCT Pub. No.: WO97/26303

PCT Pub. Date: Jul. 24, 1997

(30) Foreign Application Priority Data

Jan. 18, 1996 (SE) .................................................... 9600153

(51) Int. Cl.⁷ ............................... C08J 3/02; C08K 3/20; C08L 33/04
(52) U.S. Cl. .......................... 524/501; 524/502; 524/522; 524/526; 524/514; 523/402
(58) Field of Search .................................... 524/145, 141, 524/375, 376, 377, 501, 502, 522, 526, 514; 523/402; 525/117, 119

(56) References Cited

U.S. PATENT DOCUMENTS

| | | | |
|---|---|---|---|
| 4,329,266 | 5/1982 | Suzuki et al. ........................ | 524/376 |
| 5,290,828 * | 3/1994 | Craun et al. ......................... | 523/423 |
| 5,389,703 * | 2/1995 | Lee ....................................... | 523/406 |
| 5,476,890 | 12/1995 | Heiss ..................................... | 524/244 |

FOREIGN PATENT DOCUMENTS 0225611A  6/1987  (EP) .

OTHER PUBLICATIONS

Dialog Information Services, File 351, Derwent WPI, "Quick Drying, High Glowss aw. Coating compsn. Binder comprises . . . ".

WPI/Derwent, WPI accession no. 79–05171B, Dainippon Toryo KK, "Aq. Varnish dispersion prepn—by reacting . . . ".

* cited by examiner

Primary Examiner—Samuel A. Acquah
Assistant Examiner—U. K. Rajguru
(74) Attorney, Agent, or Firm—Stevens, Davis, Miller & Mosher, L.L.P.

(57) ABSTRACT

The invention relates to a water-borne hybrid binder composition. It is obtained by mixing about 20–80% by weight of A), an aqueous dispersion of a polymer, said dispersion having a dry-solids content of at least 45% by weight, and containing at least 0.1% by weight of B) a single surfactant or a mixture of two or more different surfactants and protective colloids, and about 80–20% of C) one or more resins being emulsifiable in water and having a dry solids content above 90% by weight, by adding the resin C to the dispersion A under agitation, the resulting hybrid binder composition obtaining a dry-solids content of 60–95% by weight. The invention also relates to the use of the binder composition as a component in a paint or lacquer mixture.

18 Claims, No Drawings

WATER-BORNE HYBRID BINDER COMPOSITION AND USE THEREOF

The present invention relates to a water-borne hybrid binder composition, as well as use thereof as a component in a paint or lacquer mixture.

Binders for paints and lacquers comprise, inter alia, the following two groups, a first group containing an organic solvent and a second group having water as solvent or dispersing agent.

The organic solvents in paints and lacquers cause a great deal of inconvenience. In recent years, above all health hazards for professional painters and decorators have been noticed when daily using such paints.

It would, of course, be natural to change to water-based systems in order to avoid the above-mentioned inconvenience of the organic solvents. However, the water-based paints and lacquers that have been available on the market up to now have not been sufficiently good to replace the paints and lacquers containing an organic solvent. Thus, the water-based products have generally resulted in surfaces that are more sensitive to scratching and water. Besides, it has not been possible in these products to reach a dry-solids content above about 60% by weight while maintaining a suitable application viscosity. This means that a relatively great amount of energy is required for drying and transporting the products. Moreover, considerable amounts of water in the products cause other types of inconvenience, such as rising fibres when painting on wood.

The present invention has quite unexpectedly made it possible to eliminate the above-mentioned inconvenience and to provide a water-borne hybrid binder composition.

The composition has a high dry-solids content and at the same time a low viscosity which make many paint formulation alternatives possible. Traditionally paints with a high dry-solids content have been formulated for example by using a high proportion of filler. At the present type of hybrid binder it is not necessary to take such measures to obtain a high dry-solids content. However, if a high proportion of filler is used this results in a further increase of the dry-solids content, Accordingly, the possibilities to vary the paint formulation ary very substantial.

If a hybrid binder with a high dry-solids content is produced with conventional binders such as an acrylate dispersion and an emulsified alkyd the viscosity will become too high to allow the binder to be used for a paint formulation.

The reason for the high dry-solids content and the low viscosity of the present hybrid binder is probably that the emulsifiable resin and the dispersion are formulated in such a way that the emulsifiable resin partially diffuse into the particles of the dispersion.

The selection of the components of the emulsifiable resin and the dispersion respectively is also of great importance for the compatibility of the hybrid system in the paint formulation as well as in the cured film. At the production of the hybrid binder the selection of surfactant is of crucial importance for the stability.

The composition is obtained by mixing 20–80, preferably 20–60% by weight of A), an aqueous dispersion of a polymer prepared from one or more monomers from at least one of the groups i) a carboxyl functional monomer such as acrylic acid, methacrylic acid, crotonic acid, itaconic acid, maleic acid, fumaric acid and the like
ii) a hydroxyl functional monomer such as 2-hydroxyethyl acrylate, hydroxypropyl acrylate, hydroxybutyl acrylate, 2-hydroxyethyl methacrylate, hydroxypropyl methacrylate, hydroxybutyl methacrylate, allyl alcohol, methallyl alcohol and the like
iii) an epoxy functional monomer such as glycidyl methacrylate and the like
iv) an amino functional monomer such as acrylamide, methacrylamide, ethyl imidazolidon methacrylate and the like
v) an alkyl acrylate or an alkyl methacrylate such as methyl acrylate, ethyl acrylate, butyl acrylate, 2-ethylhexyl acrylate, stearyl acrylate, methyl methacrylate, ethyl methacrylate, butyl methacrylate, stearyl methacrylate, isobornyl acrylate, isobornyl methacrylate and the like
vi) a polymerisable aromatic monomer, such as styrene, α-methyl styrene, vinyl toluene, t-butyl styrene, diallyl phthalate and the like
vii) an α-olefin such as ethylene, propylene and the like
viii) a vinyl monomer such as vinyl acetate, vinyl propionate, vinyl versatate, dibutyl maleate and the like, or
ix) a diene monomer such as butadiene, isoprene and the like, said dispersion having a dry-solids content of at least 45% by weight, preferably 50–65% by weight and containing at least 0.1% by weight, preferably 0.5–5% by weight of B) a single surfactant or a mixture of two or more different surfactants and protective colloids from at least one of the groups i) an ethoxylated nonionic surfactant such as alkylphenol ethoxylate, alcohol ethoxylate having different degrees of ethoxylation and similar compounds
ii) a nonionic sugar-based surfactant such as a nonethoxylated surfactant prepared with glycose or the like as polar part
iii) an anionic surfactant such as alkyl sulphate, alkyl ether sulphate, alkyl phenol ether sulphate, dialkyl sulfosuccinate, hemisulfosuccinate, alkyl phosphate, alkyl ether phosphate, alkyl phenol phosphate, alkyl phenol ether phosphate and the like, and
iv) a protective colloid such as a cellulose derivative, polyvinyl alcohol and the like, and about 80–20, preferably 80–40% by weight of C) a resin being emulsifiable in water and having a dry-solids content above 90% by weight, preferably between 92 and 99.5% by weight and consisting of one or more resins from at least one of the groups i) a polyester
ii) an alkyd resin
iii) an epoxy resin or an epoxy ester
iv) a polyurethane
v) a polyether
vi) a fatty acid, an epoxidised fatty acid or an ester of one of these
vii) a blocked di- or polyisocyanate
viii) an amino resin such as a melamine-formaldehyde resin or urea-formaldehyde resin, or
ix) an acryl or vinyl resin, by adding the resin C to the dispersion A under agitation, the resulting hybrid binder composition obtaining a dry-solids content of 60–95% by weight, preferably 65–85% by weight and a viscosity of max. 100 Pa.s, preferably 0.2–70 Pa.s at room temperature.

The resin C normally contains at least 0.1% by weight, preferably 0.5–5% by weight of B before adding it to the dispersion A. Optionally, B and C can be added separately to the dispersion A. If the dispersion A contains a sufficiently high content of B, it might be possible to eliminate the addition of B in the resin C, or together with this.

According to the invention, it is important that the resin C which is emulsifiable in water is added to the aqueous polymer dispersion A and mixed therewith. The inversed mixing procedure does not result in a hybrid binder composition having the good properties according to the invention.

For a successful result, it is further suitable to effect the mixing procedure in a gentle manner by successive adding. Use can be made of, for instance, an agitator of the dissolver type. The process equipment including the agitator can be of a fairly simple type having a relatively low power consumption.

The dispersion A normally has a viscosity of 0.5–30 Pa.s, preferably 0.5–10 Pa.s, most preferred 0.5–4 Pa.s.

According to the invention, it has been found that the emulsified droplets of the resin C and the particles of the dispersion A interact so as to stabilise each other and make it possible to produce a stable, fluid hybrid binder composition having a dry-solids content of up to 95% by weight. The composition normally has a stability of at least 12 months, but it is not unusual to have a stability of 18 months.

Furthermore, it has been noticed according to the invention that the average size of the droplets of the emulsified resin C in such a hybrid system generally is smaller than that of the droplets in an emulsion prepared from the same resin while using the same equipment and using water as continuous medium.

The binder composition optionally contains a diluent and/or catalyst. The diluent normally is water. As a rule, the composition contains no organic solvent. If desired, a small amount thereof may, however, be included, for instance 0.2–5% by weight based on the entire composition.

Advantageously, the dispersion A is an acrylate polymer, styrene acrylate polymer or a vinyl acetate polymer, and the resin C is an alkyd resin or a polyester.

The various resins C according to the invention can be prepared in conventional manner.

Thus, polyester resins can be obtained by polycondensation of mono- and polycarboxylic acids having mono- and polyhydroxy-functional components. Examples of monocarboxylic acids are benzoic acid, para-tertiary butylbenzoic acid, nonanoic acid, isononanoic acid, lauric acid, and examples of polycarboxylic acids are linear difunctional carboxylic acids such as oxalic acid, succinic acid, succinic anhydride, adipic acid, azelaic acid and sebacic acid, fumaric acid, maleic acid and maleic anhydride as well as aromatic carboxylic acids such as phthalic acid, phthalic anhydride, isophthalic acid, terephthalic acid, tetrahydrophthalic acid, tetrahydrophthalic anhydride, hexahydrophthalic acid, hexahydrophthalic anhydride, tetrabromophthalic acid, tetrabromophthalic anhydride, trimellitic acid, trimellitic anhydride, pyromellitic acid, pyromellitic anhydride, 1,4,5,6,7,7-hexachloro-5-norbornene-2,3-dicarboxylic acid (chlorendic acid) and 1,4,5,6,7,7-hexachloro-5-norbornene-2,3-dicarboxylic anhydride (chlorendic anhydride).

Examples of monofunctional alcohols are methanol, ethanol, propanol, butanol, 2-ethylhexanol, and examples of polyfunctional alcohols are glycols such as ethylene glycol, propylene olycol, 1,3-butanediol, 1,4-butanediol, 1,6-hexanediol, diethylene glycol, neopentyl glycol, 2-butyl-2-ethyl-1,3-propanediol (BEPD) and triethylene glycol, bisphenol A, hydrogenised bisphenol A, bisphenol dihydroxypropylether, glycerol, trimethylolethane, trimethylolpropane, pentaerythritol, dipentaerythritol, tripentaerythritol, trimethylolpropane monoallyl ether, trimethylolpropane diallyl ether etc. Moreover, use can be made of components containing both carboxylic acid groups and hydroxyl groups, for instance dimethylolpropionic acid (bis-MPA).

Alkyd resin can be prepared by reaction of the above-mentioned mono- and polycarboxylic acids with said mono- and polyhydroxy-functional alcohols and oils or fatty acids. The oil can be either vegetable or animal. Suitable oils and fatty acids that can be used include fish oil, safflower oil, sunflower seed oil, rapeseed oil, linseed oil, wood oil, oiticica oil, soybean oil, ricinous oil, dehydrated ricinous oil, coconut oil, dehydrated coconut oil, epoxidised linseed oil, epoxidised soybean oil, vernonia oil, tall oil fatty acid, soybean oil fatty acid, rapeseed oil fatty acid, stearic acid, 12-hydroxystearic acid, octylic acid etc.

The above-mentioned resins can be modified with silanes and silanols, such as methyltrimethoxysilane, propyltrimethoxysilane, 3-aminopropyltrimethoxysilane; acetal-functional monomers, such as 4-aminobutyraldehyde diethylacetal and 4-aminobutyraldehyde dimethylacetal; acetoacetates, such as acetoacetoxyethyl methacrylate (AAEM), tertiary butylacetoacetate and ethylacetoacetate; vinyl and acryl monomers, such as styrene, vinyl chloride, vinyl acetate, methyl acrylate, methyl methacrylate, ethyl acrylate, ethyl methacrylate, butyl acrylate, hydroxyethyl methacrylate, acrylic acid, methacrylic acid, glycidyl acrylate and glycidyl methacrylate; isocyanates, such as 2,4-toluene diisocyanate (TDI), epoxy, such as a glycidylester of a saturated mono carboxylic mixture (Cardura E from Shell).

Epoxy ester resins can be prepared by reaction between the above-mentioned mono- and polycarboxylic acids, fatty acids and epoxy resins, such as of Epikote type and bisphenol A diglycidylether.

Polyether resin can be prepared by polymerisation of epoxides, such ethylene oxide, propylene oxide, butylene oxide, epichlorohydrin, styrene oxide and tetrahydrofuran in the presence of a catalyst such as a Lewis acid.

Polyurethane resins can be obtained by reacting the above-mention mono- and polycarboxylic acids and mono- and/or polyhydroxy-functional alcohols with polyisocyanates, such as ethylenediisocyanate, tetramethylenediisocyanate, hexamethyienediisocyanate, dodecanemethylenediisocyanate, 1,3-cyclobutanediisocyanate, 3-isocyanato-3,5,5-trimethylcyclohexyldiisocyanate (IPDI), 4,4'-diisocyanatodicyclohexylmethane, 2,4-toluenediisocyanate and 2,6-toluenediisocyanate.

Melamine-formaldehyde resin and urea-formaldehyde resin are examples of suitable amino resins.

Examples of blocked di- and polyisocyanates are Desmodur VPLS2025 from Bayer (hydrophilic, aliphatic polyisocyanate based on hexamethylene diusocyanate), Bayhydur LS 2032 from Bayer (hydrophilic, aliphatic polyisocyanate based on hexamethylene diisocyanate) and Basonat P LR 8878X from BASF (hydrophilic, aliphatic polyisocyanate based on hexamethylene diisocyanate).

Acryl and vinyl resin can be prepared by polymerisation of acryl and vinyl monomers, such as styrene, vinyl chloride, vinyl acetate, methyl acrylate, methyl methacrylate, ethyl acrylate, ethyl methacrylate, butyl acrylate, hydroxyethyl methacrylate, acrylic acid and methacrylic acid. The monomers are polymerised in the presence of an initiator, for instance benzoylperoxide, tertiary butylperoxide, cumic hydroxyperoxide or azo-bisisobutyronitrile.

The hybrid binder compositions according to the invention can be cured via a plurality of per se known curing mechanisms, viz.

a) Oxidative curing by unsaturated fatty acids, optionally in combination with other unsaturation such as allyl, acrylate and vinyl.
b) Radiation-induced radical curing (unsaturation), for instance UV and electron-beam curing.
c) Peroxide-induced radical curing (unsaturation).
d) Isocyanate+OH (blocked or unblocked isocyanate).
e) Amino resin+OH (temperature or catalytic curing).
f) Acetal+OH.
g) Epoxy curing.
h) Acetoacetate curing.

The above-mentioned curing mechanisms are suitably used in the following combinations of dispersion A and resin C.

a) The dispersion A has no reactive functions or is grafted with fatty acid or with allylether functions.
   The resin C is alkyd, polyester and/or epoxy ester with unsaturated fatty acids.
d1) The dispersion A is a hydroxy-functional or non-hydrogen-functional dispersion. The resin C is a hydroxy-functional resin having an addition of unblocked di/triisocyanate before application ("2-pack", low-temperature curing).
d2) The dispersion A is a hydroxy-functional or non-hydrogen-functional dispersion.
   The resin C is a hydroxy-functional resin with an addition of blocked di/triisocyanate before application ("1-pack", oven curing).
e1) The dispersion A is a hydroxy-functional dispersion.
   The resin C is a hydroxy-functional resin with an addition of melamine or urea and an acid catalyst (acid curing).
e2) The dispersion A is a hydroxy-functional dispersion.
   The resin C is a hydroxyfunctional resin with an addition of melamine or urea (oven curing).
f1) The dispersion A is an acetal-functional dispersion.
   The resin C is an OH-functional resin having an acid catalyst added before application.
f2) The dispersion A is an OH-functional dispersion.
   The resin C is an acetal-functional resin with an acid catalyst added before application.
f3) The dispersion A is an acetal- and OH-functional dispersion.
   The resin C is an acetal- and OH-functional resin with an acid catalyst added before application.
g1) The dispersion A is a carboxy-functional dispersion.
   The resin C is an epoxy-functional resin.
g2) The dispersion A is an epoxy-functional dispersion.
   The resin C is a carboxy-functional resin.
h1) The dispersion A is an acetoacetate-functional, a hydroxy-functional or a nonfunctional dispersion.
   The resin C is an acetoacetate-functional resin with an addition of melamine (acid catalysis).
h2) The dispersion A is an acetoacetate-functional or a hydroxy-functional dispersion.
   The resin C is an acetoacetate- or hydroxy-functional resin with an addition of isocyanate (oven curing).
h3) The dispersion A is an acetoacetate-functional dispersion.
   The resin C is an acetoacetate-functional resin with an addition of aldehydes (oven curing).
h4) The dispersion A is a non-acetoacetate-functional dispersion.
   The resin C is an acetoacetate-functional resin with an addition of diamines (oven curing).
h5) The dispersion A is an acetoacetate-functional dispersion.
   The resin C is an acetoacetate-functional resin containing unsaturation together with an alkaline curing agent (Michael addition).

The invention will be described in more detail with reference to the Examples below, Examples 1–4 showing the preparation of various dispersions A, Examples 5–11 showing the preparation of various resins C, Examples 12–24 showing the preparation of various hybrid binder compositions and Examples 25–34 showing the use of hybrid binder compositions in various paints and lacquers.

EXAMPLE 1

180 parts by weight of water were charged into a 2-litre calorimetric reactor having an anchor-type agitator. The reactor was heated to the polymerisation temperature 82° C. In a separate vessel, a monomer emulsion was prepared by charging 318 parts by weight of water, 0.5 parts by weight of sodium hydroxide, 14.3 parts by weight of anionic surfactant Disponili™ FES 77 from Henkel (fatty alcohol polyglycol ether sulphate, Na-salt), 9.5 parts by weight of nonionic surfactant Disponil™ A 3065 from Henkel (a mixture of etoxylated linear fatty alcohols), 253 parts by weight of methyl methacrylate, 303 parts by weight of butyl acrylate, 253 parts by weight of styrene and 8 parts by weight of methacrylic acid. The mixture was agitated vigorously, thereby forming a monomer emulsion. 55 parts by weight of the monomer emulsion together with 0.2 parts by weight of ammonium persulphate dissolved in 5 parts by weight of water were charged into the reactor. When the precharge had reacted completely, the remaining monomer emulsion was charged, together with a solution of 2.25 parts by weight of ammonium persulphate dissolved in 60 parts by weight of water, into the reactor at a constant feed rate during 3.5 h. After the continuous charging had been completed, the temperature 82° C. was maintained for one more hour. The resulting styrene acrylate polymer dispersion was allowed to cool to room temperature and then had a viscosity of 2 Pa.s. The dry-solids content was 60% by weight.

EXAMPLE 2

180 parts by weight of water were charged into a 2-litre calorimetric reactor having an anchor-type agitator. The reactor was heated to the polymerisation temperature 82° C. In a separate vessel, a monomer emulsion was prepared by charging 318 parts by weight of water, 0.5 parts by weight of sodium hydroxide, 14.3 parts by weight of anionic surfactant DisponilT FES 77 from Henkel, 9.5 parts by weight of nonionic surfactant DisponilTm A 3065 from Henkel, 237 parts by weight of methyl methacrylate, 237 parts by weight of styrene, 294 parts by weight of butyl acrylate and 8 parts by weight of methacrylic acid. The mixture was agitated vigorously, thereby forming a monomer emulsion. 55 parts by weight of the monomer emulsion together with 0.2 parts by weight of ammonium persulphate dissolved in 5 parts by weight of water were charged into the reactor. When the precharge had reacted completely, the remaining monomer emulsion was charged together with a solution of 2.25 parts by weight of ammonium persulphate dissolved in 60 parts by weight of water. into the reactor at a constant feed rate during 2.5 h. After 2.5 h, 41 parts by weight of hydroxyethyl methacrylate were charged into the remaining monomer emulsion in the separate vessel, whereupon the monomer emulsion was reemulsified and continuously charged into the reactor during 60 min. After completion of the continuous charging, the temperature 82° C. was maintained for one more hour. The resulting styrene acrylate dispersion was allowed to cool to room temperature and then had a viscosity of 2 Pa.s. The dry-solids content was 60% by weight.

EXAMPLE 3

180 parts by weight of water were charged into a 2-litre calorimetric reactor having an anchor-type agitator. The reactor was heated to the reaction temperature 82° C. In a separate vessel, a monomer emulsion was prepared by charging 318 parts by weight of water, 0.5 parts by weight of sodium hydroxide, 14.3 parts by weight of anionic surfactant Disponil™ FES 77 from Henkel, 9.5 parts by weight of nonionic surfactant Disponil™ A 3065 from Henkel, 482 parts by weight of methyl methacrylate, 310 parts by weight of butyl acrylate and 8 parts by weight of methacrylic acid. The mixture was agitated vigorously, thereby forming a monomer emulsion. 55 parts by weight of the monomer emulsion together with 0.2 parts by weight of ammonium persulphate dissolved in 5 parts by weight of water were charged into the reactor. When the precharge had reacted completely, the major part of the remaining monomer emulsion together with a solution of 2.25 parts by weight of ammonium persulphate dissolved in 60 parts by weight of water were charged into the reactor at a constant feed rate during 3 h. After 3 h, 16 parts by weight of glycidyl methacrylate were charged into the remaining monomer emulsion in the separate vessel, whereupon the monomer emulsion was reemulsified and continuously charged into the reactor during 30 min. After completion of the continuous charging, the temperature 82° C. was maintained for one more hour. The resulting acrylate polymer dispersion was allowed to cool to room temperature and then had a viscosity of 2 Pa.s. The dry-solids content was 60% by weight.

EXAMPLE 4

180 parts by weight of water were charged into a 2-litre calorimetric reactor having an anchor-type agitator. The reactor was heated to the polymerisation temperature 82° C. In a separate vessel, a monomer emulsion was prepared by charging 318 parts by weight of water, 0.5 parts by weight of sodium hydroxide, 14.3 parts by weight of anionic surfactant Disponilm FES 77 from Henkel, 9.5 parts by weight of nonionic surfactant DisponilTm A 3065 from Henkel, 237 parts by weight of methyl methacrvlate, 294 parts by weight of butyl acrylate, 237 parts by weight of styrene and 8 parts by weight of methacrylic acid. The mixture was agitated vigorously, thereby forming a monomer emulsion. 55 parts by weight of the monomer emulsion together with 0.2 parts by weight of ammonium persulphate dissolved in 5 parts by weight of water were charged into the reactor. When the precharge had reacted completely, the major part of the remaining monomer emulsion together with a solution of 2.25 parts by weight of ammonium persulphate dissolved in 60 parts by weight of water were charged into the reactor at a constant feed rate during 3 h. After 3 h, 41 parts by weight of glycidyl methacrylate were charged into the remaining monomer emulsion in the separate vessel, whereupon the monomer emulsion was reemulsified and continuously charged into the reactor during 30 min. After completion of the continuous charging, the temperature 82° C. was maintained for one more hour. When the polymerisation was completed, the functional groups were subjected to a secondary reaction, in this case the epoxy groups from the glycidyl methacrylate with the amine 4-aminobutyraldehyde dimethylacetal at a temperature of 60° C. during 45 min. The resulting styrene acrylate polymer dispersion was allowed to cool to room temperature and then had a viscosity of 2 Pa.s. The dry-solids content was 60% by weight.

EXAMPLE 5

44 parts by weight of tall oil fatty acid, 14 parts by weight of pentaerythritol, 12 parts by weight of isophthalic acid and 1 part by weight of trimethylolpropane were supplied to a reaction flask. The mixture was then heated in nitrogen gas atmosphere to 230° C. The reaction mixture was kept at this temperature until an acid number below 10 had been reached. Subsequently, the mixture was cooled to 150° C., and 29 parts by weight of tall oil fatty acid were added. The temperature was again raised to 230° C. The reaction mixture was kept at this temperature until an acid number below 12 had been reached.

The resulting alkyd had a dry-solids content of 99.5% by weight, an average molecular weight of about 6000, a polydispersity index of about 2.5 and a viscosity of 2.5 Pa.s (2500 cP) at 23° C.

EXAMPLE 6

52 parts by weight of tall oil fatty acid, 11 parts by weight of pentaerythritol, 22 parts by weight of isophthalic acid and 15 parts by weight of trimethylolpropane were supplied to a reaction flask. The mixture was then heated in nitrogen gas atmosphere to 230° C. The reaction mixture was kept at this temperature until an acid number below 10 had been reached.

The resulting alkyd had a dry-solids content of 99.5% by weight, an average molecular weight of about 6000, a polydispersity index of about 3.0 and a viscosity of 2.5 Pa.s (2500 cP) at 75° C.

EXAMPLE 7

52 parts by weight of 1 2-hydroxystearic acid, 11 parts by weight of pentaerythritol, 22 parts by weight of isophthalic acid and 15 parts by weight of trimethylolpropane were supplied to a reaction flask. The mixture was then heated in nitrogen gas atmosphere to 230° C. The reaction mixture was kept at this temperature until an acid number below 10 had been reached. The resulting hydroxy-functional polyester had a dry-solids content of 99.5% by weight, an average molecular weight of about 5500, a polydispersity index of about 2.5 and a viscosity of 2.5 Pa.s (2500 cP) at 50° C.

EXAMPLE 8

144 parts by weight of pentaerythritol and 2000 parts by weight of dimethylolpropionic acid were supplied to a reaction flask. The mixture was then heated in nitrogen gas atmosphere to 230° C. The reaction mixture was kept at this temperature until an acid number below 10 had been reached. The reaction mixture was then cooled down to 150° C., whereupon 3000 parts by weight of tall oil fatty acid were added. The temperature was again increased to 230° C. This temperature was maintained until the acid number was below 10. The resulting alkyd had a dry-solids content of 99.5% by weight and was suitable for use in air-drying systems.

EXAMPLE 9

144 parts by weight of pentaerythritol and 2000 parts by weight of dimethylolpropionic acid were supplied to a reaction flask. The mixture was then heated in nitrogen gas atmosphere to 230° C. The reaction mixture was kept at this temperature until an acid number below 10 had been reached. The reaction mixture was then cooled down to 100° C., whereupon 1 part by weight of hydroquinone and 75 parts by weight of acrylic acid were added. The temperature was increased to 150° C. This temperature was maintained until the acid number was below 10. The resulting polyester acrylate had a dry-solids content of 99.5% by weight and was suitable for peroxide- or radiation-curing systems.

EXAMPLE 10

100 parts by weight of the product obtained according to Example 5 were charged into a reaction flask together with 10 parts by weight of 3-isocyanatomethyl-3,5,5-trimethylcyclohexyl diisocyanate. These ingredients were mixed for 30 min, whereupon the temperature was increased to 55° C. during a period of time of 30 min. This temperature was maintained for 90 min. The mixture was cooled to room temperature, whereupon 6 parts by weight of 4-aminobutyric aldehyde dimethylacetal were added. The temperature was increased to 30° C. and maintained for one hour. Subsequently, the temperature was increased to 60° C. and maintained for 3 h. The resulting product was an acetal-modified alkyd.

EXAMPLE 11

300 parts by weight of the tetrahydrophthalic anhydride, 117 parts by weight of maleic anhydride, 192 parts by weight of ethylene glycol, 158 parts by weight of diethylene glycol and 0.003 parts by weight of hydroquinone were supplied to a reaction flask. The temperature was increased to 160° C. This temperature was maintained for three hours, whereupon it was increased to 180° C. When an acid number below 30 had been reached, the reaction mixture was cooled to 120° C., whereupon 169 parts by weight of maleic anhydride were charged together with 0.003 parts by weight of hydroquinone. The temperature was then increased to 180° C. and kept there until an acid number below 60 had been reached, whereupon the reaction mixture was cooled to 100° C. 64 parts by weight of glycidyl methacrylate and 0.003 parts by weight of hydroquinone were charged. The temperature was then increased to 140° C. and maintained at this temperature until an acid number below 10 had been reached. The resulting unsaturated polyester had a dry-solids content of 99.0% by weight and was suitable for peroxide or UV-curing.

EXAMPLE 12

3.7 parts by weight of anionic surfactant Disponil™ FES 77 from Henkel and 1.1 parts by weight of nonionic surfactant Disponil™ A 3065 from Henkel were mixed with 100 parts by weight of the alkyd prepared according to Example 6. The resulting mixture was gently added at 75° C. to 100 parts by weight of acryl polymer dispersion in a dissolver-type agitator. The dispersion was prepared according to Example 2. To obtain a suitable viscosity, 13 parts by weight of water were added. Then a hybrid binder mixture having a dry-solids content of about 75% by weight and a viscosity of 1.05 Pa.s (1050 cP Brookfield) at room temperature was obtained.

EXAMPLE 13

3.7 parts by weight of anionic surfactant Disponil™ FES 77 from Henkel and 1.1 parts by weight of nonionic surfactant DisponilT A 3065 from Henkel were mixed with 100 parts by weight of the alkyd prepared according to Example 7. The resulting mixture was gently added at 50° C. to 100 parts by weight of acryl polymer dispersion in a dissolver-type agitator. The dispersion was prepared according to Example 2. To obtain a suitable viscosity, 13 parts by weight of water were added. Then a hybrid binder mixture having a dry-solids content of about 75% by weight and a viscosity of 45.0 Pa.s (45000 cP Brookfield) at room temperature was obtained.

EXAMPLE 14

3.7 parts by weight of anionic surfactant Disponil™ FES 77 from Henkel and 1.1 parts by weight of nonionic surfactant Disponil™ A 3065 from Henkel were mixed with 100 parts by weight of pohlyurethane binder Bayhydur™ LS2032 from Bayer. The resulting mixture was gently added at room temperature to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 60.0 Pa.s (60000 cP Brookfield) at room temperature was obtained.

EXAMPLE 15

3.7 parts by weight of anionic surfactant Disponil™ FES 77 from Henkel and 1.1 parts by weight of nonionic surfactant Disponil™ A 3065 from Henkel were mixed with 100 parts by weight of polyether resin Desmophen™ 550U (polyether polyol) from Bayer. The resulting mixture was gently added at room temperature to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 35.0 Pa.s (35000 cP Brookfield) at room temperature was obtained.

EXAMPLE 16

3.7 parts by weight of anionic surfactant Disponil™ FES 77 from Henkel and 1.1 parts by weight of nonionic surfactant Disponil™ A 3065 from Henkel were mixed with 100 parts by weight of polyether alcohol resin, Desmophen™ 250U (polyether alcohol) from Bayer. The resulting mixture was gently added at room temperature to 100 parts by weight of acryl polymer dispersion in a dissolver-type agitator. The dispersion was prepared according to Example 1. A hybrid binder mixture having a dry-solids content of about 80% by weight and a viscosity of 0.5 Pa.s (500 cP Brookfield) at room temperature was obtained.

EXAMPLE 17

3.7 parts by weight of anionic surfactant Disponil™ FES 77 from Henkel and 1.1 parts by weight of nonionic tenside Disponil™ A 3065 from Henkel were mixed with 100 parts by weight of trimer fatty acid, Empol™ 1040 from Henkel. The resulting mixture was gently added at room temperature to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 0.95 Pa.s (950 cP Brookfield) at room temperature was obtained.

EXAMPLE 18

3.7 parts by weight of anionic surfactant Disponil™ FES 77 from Henkel and 1.1 parts by weight of nonionic surfactant Disponil™ A 3065 from Henkel were mixed with 100 parts by weight of soybean oil. The resulting mixture was gently added at room temperature to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 0.75 Pa.s (750 cP Brookfield) at room temperature was obtained.

EXAMPLE 19

3.7 parts by weight of anionic surfactant Disponil™ FES 77 from Henkel and 11 parts by weight of nonionic surfactant Disponil™ A 3065 from Henkel were mixed with 100 parts by weight of tall oil fatty acid. The resulting mixture was gently added at room temperature to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 70.0 Pa.s (70000 cP Brookfield) at room temperature was obtained.

EXAMPLE 20

3.7 parts by weight of anionic surfactant Disponil™ FES 77 from Henkel and 1.1 parts by weight of nonionic surfactant Disponil™ A 3065 from Henkel were mixed with 100 parts by weight of rapeseed oil fatty acid. The resulting mixture was gently added at room temperature to 100 parts by weight of acryl polymer dispersion in a dissolver-type agitator. The dispersion was prepared according to Example 3. To obtain a suitable viscosity, 13 parts by weight of water were added. A hybrid binder mixture having a dry-solids content of about 75% by weight and a viscosity of 70.0 Pa.s (70000 cP Brookfield) at room temperature was obtained.

EXAMPLE 21

3.7 parts by weight of anionic surfactant Disponil™ FES 77 from Henkel and 1.1 parts by weight of nonionic surfactant Disponil™ A 3065 from Henkel were mixed with 100 parts by weight of epoxidised linseed oil. The resulting mixture was gently added at room temperature to 100 parts by weight of acryl polymer dispersion in a dissolver-type agitator. The dispersion was prepared according to Example 3. To obtain a suitable viscosity, 13 parts by weight of water were added. A hybrid binder mixture having a dry-solids content of about 75% by weight and a viscosity of 3.0 Pa.s (3000 cP Brookfield) at room temperature was obtained.

EXAMPLE 22

3.7 parts by weight of anionic surfactant Disponil™ FES 77 from Henkel and 1.1 parts by weight of nonionic surfactant Disponil™ A 3065 from Henkel were mixed with 100 parts by weight of the alkyd prepared according to Example 7. The resulting mixture was gently added at 75° C. to 100 parts by weight of acryl polymer dispersion in a dissolver-type agitator. The dispersion was prepared according to Example 4. To obtain a suitable viscosity, 13 parts by weight of water were added. A hybrid binder mixture having a dry-solids content of about 75% by weight and a viscosity of 70.0 Pa.s (70000 cP Brookfield) at room temperature was obtained.

EXAMPLE 23

3.7 parts by weight of anionic surfactant Disponil™ FES 77 from Henkel and 1.1 parts by weight of nonionic surfactant Disponil™ A 3065 from Henkel were mixed with 100 parts by weight of the acetal-modified polyester prepared according to Example 10. The resulting mixture was gently added at 75° C. to 100 parts by weight of acryl polymer dispersion in a dissolver-type agitator. The dispersion was prepared according to Example 4. To obtain a suitable viscosity, 13 parts by weight of water were added. A hybrid binder mixture having a dry-solids content of about 75% by weight and a viscosity of 50.0 Pa.s (50000 cP Brookfield) at room temperature was obtained.

EXAMPLE 24

3.7 parts by weight of anionic surfactant Disponil™ FES 77 from Henkel and 1.1 parts by weight of nonionic surfactant Disponil™ A 3065 from Henkel were mixed with 100 parts by weight of the unsaturated polyester prepared according to Example 11. The resulting mixture was gently added at 75° C. to 100 parts by weight of acryl polymer dispersion in a dissolver-type agitator. The dispersion was prepared according to Example 1. To obtain a suitable viscosity, 13 parts by weight of water were added. A hybrid binder mixture having a dry-solids content of about 75% by weight and a viscosity of 60.0 Pa.s (60000 cP Brookfield) at room temperature was obtained.

EXAMPLE 25

A UV-curing pigmented white coating was prepared by mixing the following components

| | |
|---|---|
| Hybrid binder according to Example 24 | 100 parts by weight |
| Titandioxide A (TiO$_2$) from Tioxide | 40 parts by weight |
| Syloid W 500 from Grace (amorphous SiO$_2$ 50% in 50% water) | 5.0 parts by weight |
| Dehydran 1293 from Henkel Nopco (modified polysiloxanes 10% in 90% butylglycol) | 0.5 parts by weight |
| Byk 346 from Byk Chemie (polysiloxanes 46% in dipropylene glycol monomethylether 54%) | 0.5 parts by weight |
| Cobolt Siccatol 10% from Akzo (cobolt metal content 10% in white spirit) | 1.0 parts by weight |
| Irgacure 1700 from Ciba (25% bis(2,6-dimethoxy benzoyl)-2,4,4-trimethyl-pentylphosphineoxide and 75% 2-hydroxy-2-methyl-1-phenyl-propane-1-one) | 2.5 parts by weight |
| Dowanol PnB from Dow (propylene glycol-n-butyl ether) | 2.0 parts by weight |

Before applying the coating on a glass plate 1.2% by weight of hydrogen peroxide was added (hydrogen peroxide 20% in 80% water). The applied layer of coating was aerated for 10 min at a temperature of 30–50° C. to remove water.

The coated glass plate was placed on a band moving at a speed of 2 m/min under a mercury lamp producing 80 W/cm and a gallium lamp producing 120 W/cm. The glass plate was allowed to pass under the lamps once. The UV-curing effected by the lamps resulted in a hard white film having good surface resistivity. The stacking properties of the painted products after curing were also good.

The hydrogen peroxide can be left out in the above composition. A product with similar properties is then obtained.

EXAMPLE 26

A clear lacquer was prepared by mixing the following components.

| | |
|---|---|
| Hybrid binder according to Example 24 | 100 parts by weight |
| Syloid W 500 from Grace | 5.0 parts by weight |
| Dehydran 1293 from Henkel Nopco | 0.5 parts by weight |
| Byk 346 from Byk Chemie | 0.5 parts by weight |
| Cobolt Siccatol 10% from Akzo | 1.0 parts by weight |
| Darocure 1173 from Ciba (2-hydroxy-2-methyl-1-phenyl-propane-1-on) | 2.5 parts by weight |
| Dowanol Pnb from Dow | 2.0 parts by weight |

The lacquer was applied on a glass plate and then aerated for 5 min at 30–50° C., thereby withdrawing water.

The coated glass plate was placed on a band moving at a speed of 3 m/min under two mercury lamps, each producing 80 W/cm. The glass plate was allowed to pass under the lamps once. The UV-curing effected by means of the mercury lamps resulted in a hard, stackable film having good surface resistivity.

EXAMPLE 27

A clear lacquer was prepared by mixing the following components

| | |
|---|---|
| Hybrid binder according to Example 24 | 100 parts by weight |
| Wetting agent, Byk 346 from Byk Chemie | 0.75 parts by weight |
| Flatting agent, Syloid W 500 from Grace | 0–2.5 parts by weight |
| Cobalt accelerator containing 10% by weight cobalt | 1.5 parts by weight |
| Cyclohexaneperoxide 50% | 2 parts by weight |

The lacquer was applied on a glass plate and cured at 50° C. for 2 h. A hard stackable film having good surface resistivity was obtained. By varying the content of flatting agent, it was possible to obtain a layer of lacquer having a bright to matt surface.

EXAMPLE 28

An acid-curing clear lacquer having a brightness of 40 (Gardner 60°) for furniture was prepared by mixing the following components

| | |
|---|---|
| Hybrid binder according to Example 22 | 97% by weight |
| SiO$_2$ flatting agent, Syloid W 500 from Grace | 1,5% by weight |
| Flow agent, Byk 346 from Byk Chemie | 0.5% by weight |
| Antifoaming agent, Dehydran 1293 from Henkel Nopco | 1.0% by weight |

The dry-solids content was 75% by weight and the viscosity 50 s/D4/23° C.

Before use, an addition was made of 10% (W/W) of a catalyst consisting of 24% p-toluenesulphonic acid and 8% phosphoric acid (84%) in ethanol.

EXAMPLE 29

A white acid-curing finishing coating having a brightness of 80 (Gardner 60°) for furniture was prepared by mixing the following components

| | |
|---|---|
| Hybrid binder according to Example 13 | 48% by weight |
| Hexamethoxymethylmelamine resin (98% dry-solids content) | 4% by weight |
| Methylated urea formaldehyde resin (96% dry-solids content) | 6% by weight |
| TiO$_2$ pigment paste (70% dry-solids content) | 41% by weight |
| Antifoaming agent, Dehydran 1293 from Henkel Nopco | 1.0% by weight |

The dry-solids content was 76% by weight and the viscosity 60 s/D4/23° C.

Before use, an addition was made of 10% (W/W) of a catalyst consisting of 24% p-toluenesulphonic acid and 8% phosphoric acid (84%) in ethanol.

EXAMPLE 30

An unpigmented isocyanate-curing curing primer was prepared by mixing the following components

| | |
|---|---|
| Hybrid binder according to Example 12 | 100 parts by weight |
| Isobyanate, Desmodur ™ VPLS 2025 from Bayer | 22.5 parts by weight |
| Solvent, methoxypropyl acetate | 5.7 parts by weight |

The prepared curing primer had good properties in respect of preventing bleeding-through of discolouring substances.

EXAMPLE 31

A pigmented isocyanate-curing primer and top coat were prepared by mixing the following components

| | |
|---|---|
| Hybrid binder according to Example 12 | 100 parts by weight |
| TiO$_2$, for example Tioxide TR 63 from Tioxide | 10 parts by weight |
| Dispersing agent, Dispex ™ GA40 from Allied Colloids (vinylcopolymer formulation) | 0.4 parts by weight |
| Preserving agent, Proxel ™ GXL from Zeneca (bensisotiasolin formulation) | 0.1 parts by weight |
| Desmodur ™ VP LS 2025 from Bayer | 22.8 parts by weight |
| Methoxypropylacetate | 5.7 parts by weight |

The prepared product had good properties in respect of preventing bleeding-through of discolouring substances.

EXAMPLE 32

An oxidatively drying primer and top coat were prepared by mixing the following components.

| | |
|---|---|
| Hybrid binder according to Example 12 | 100 parts by weight |
| Drying agent, Dynoadd ™ D15 from Dyno (organic metal salt formulation) | 0.5 parts by weight |
| Proxel GXL from Zeneca | 0.1 parts by weight |

EXAMPLE 33

A pigmented, oxidatively drying primer and top coat were prepared by mixing the following components.

| | |
|---|---|
| Hybrid binder according to Example 12 | 100 parts by weight |
| Dynoadd D 15 from Dyno | 0.5 parts by weight |
| Dispex GA 40 from Allied Colloids | 0.4 parts by weight |
| TiO$_2$, for example Tioxide TR 63 from Tioxide | 10 parts by weight |
| Proxel GXL from Zeneca | 0.1 parts by weight |

EXAMPLE 34

An unpigmented epoxy-curing clear lacquer was prepared by mixing the following components.

| | |
|---|---|
| Hybrid binder according to Example 21 | 100 parts by weight |
| Curing agent, HY 2969 from CIBA-Geigy (4,4-diaminodiphenyl methane 30–100%, benzylalcohol 30–100% and isoforon diamine 10–30%). | 20 parts by weight |

What is claimed is:

1. A storage stable water-borne hybrid binder composition obtained by the process comprising mixing about 20–80% by weight of A) an aqueous dispersion of a polymer prepared from one or more monomers from at least one of the groups:

i) a carboxyl functional monomer selected from the group consisting of acrylic acid, methacrylic acid, crotonic acid, itaconic acid, maleic acid and fumaric acid;
   ii) a hydroxyl functional monomer selected from the group consisting of 2-hydroxyethyl acrylate, hydroxypropyl acrylate, hydroxybutyl acrylate, 2-hydroxyethyl methacrylate, hydroxypropyl methacrylate, hydroxybutyl methacrylate, allyl alcohol and methallyl alcohol;
   iii) an epoxy functional monomer comprising glycidyl methacrylate;
   iv) an amino functional monomer selected from the group consisting of acrylamide, methacrylamide and ethyl imidazolidon metharylate;
   v) an alkyl acrylate or an alkyl methacrylate selected from the group consisting of methyl acrylate, ethyl acrylate, butyl acrylate, 2-ethylhexyl acrylate, stearyl acrylate, methyl methacrylate, ethyl methacrylate, butyl methacrylate, stearyl methacrylate, isobornyl acrylate and isobornyl methacrylate;
   vi) a polymerizable aromatic monomer selected from the group consisting of styrene, α-methyl styrene, vinyl toluene, t-butyl styrene and diallyl phthalate;
   vii) an α-olefin selected from the group consisting of ethylene and propylene;
   viii) a vinyl monomer selected from the group consisting of vinyl acetate, vinyl propionate, vinyl versatate and dibutyl maleate; and
   ix) a diene monomer selected from the group consisting of butadiene and isoprene;

said dispersion having a dry-solids content of at least 45% by weight and containing at least 0.1% by weight of B) a single surfactant or a mixture of two or more different surfactants and protective colloids from at least one of the groups:

i) an ethoxylated nonionic surfactant selected from the group consisting of alkylphenol ethoxylate and alcohol ethoxylate having different degrees of ethoxylation and similar compounds;
   ii) a nonionic sugar-based surfactant comprising a nonethoxylated surfactant prepared with glycose as polar part;
   iii) an anionic surfactant selected from the group consisting of alkyl sulphate, alkyl ether sulphate, alkyl phenol ether sulphate, dialkyl sulfosuccinate, hemisulfosuccinate, alkyl phosphate, alkyl ether phosphate, alkyl phenol phosphate and alkyl phenol ether phosphate; and
   iv) a protective colloid selected from the group consisting of a cellulose derivative and polyvinyl alcohol;

and about 80–20% by weight of C) a resin being emulsifiable in water and having a dry-solids content above 90% by weight, and comprising one or more resins from at least one of the groups;

i) a polyester
   ii) an alkyd resin
   iii) an epoxy resin or epoxy ester
   iv) a polyurethane
   v) a polyether
   vi) a fatty acid, an epoxidized fatty acid or an ester of one of these
   vii) a blocked di- or polyisocyanate
   viii) an amino resin comprising a melamine-formaldehyde resin or urea-formaldehyde resin, and
   ix) an acryl or vinyl resin;

by adding the resin C to the dispersion A under agitation, the resulting hybrid binder composition obtaining a dry-solids content of 60–95% by weight, and a viscosity of max. 100 Pa.s, at room temperature.

2. The binder composition according to claim 1, characterised in that it optionally contains a diluent and/or catalyst.

3. The binder composition according to claim 1, characterised in that the dispersion A is an acrylate polymer, styrene acrylate copolymer or vinyl acetate polymer.

4. The binder composition according to claim 1, characterised in that the resin C is an alkyd resin or a polyester.

5. The binder composition according to claim 1, characterised in the the dispersion A has a viscosity of 0.5–30 Pa.s, at room temperature.

6. The binder composition according to claim 1, wherein said composition has a storage stability of at least 12 months.

7. The binder composition according to claim 1, characterised in that the resin C contains at least 0.1% by weight.

8. The binder composition according to claim 1, wherein the dispersion A has a viscosity of 0.5–10 Pa.s at room temperature.

9. The binder composition according to claim 1, wherein the resin C contains 0.5–5% by weight of B.

10. A method of forming a paint composition by mixing the binder composition according to claim 1 with at least one pigment.

11. The method of forming a lacquer mixture comprising mixing the binder composition according to claim 1 with a flatting agent.

12. The composition of claim 1, wherein the binder composition contains 20–60% by weight of A).

13. The composition of claim 1, wherein the dry-solids content A) is 50–65% by weight.

14. The storage stable composition of claim 1, wherein B) is present in an amount of 0.5–5% by weight.

15. The storage stable composition of claim 1, wherein C) is present in an amount of 80–40% by weight.

16. The storage stable composition of claim 1, wherein C) has a dry-solids content of between 92 and 99.5% by weight.

17. The storage stable composition of claim 1, wherein said resulting hybrid binder composition has a dry-solids content of 65–85% by weight.

18. The storage stable composition of claim 1, wherein the viscosity of said resulting hybrid binder composition is 0.2–70 Pa.s at room temperature.

* * * * *